Aug. 2, 1932.  H. A. TOMKINS  1,869,445
PNEUMATIC CHUCK
Filed Aug. 20, 1930  2 Sheets-Sheet 1

INVENTOR
Harold A. Tomkins
BY Chappell & Earl
ATTORNEY

Aug. 2, 1932.  H. A. TOMKINS  1,869,445
PNEUMATIC CHUCK
Filed Aug. 20, 1930   2 Sheets-Sheet 2

INVENTOR
Harold A. Tomkins
BY Chappell & Earl
ATTORNEYS

Patented Aug. 2, 1932

1,869,445

UNITED STATES PATENT OFFICE

HAROLD A. TOMKINS, OF JACKSON, MICHIGAN

PNEUMATIC CHUCK

Application filed August 20, 1930. Serial No. 476,559.

This invention relates to improvements in pneumatic chucks for chucking crankshafts for automobiles and like irregular work.

The objects of the invention are:

First, to provide in such a pneumatic chuck an improved support with cap device having pneumatic means for locking the same about the journal of the crankshaft.

Second, to provide in connection with such chuck means improved pneumatically operated chuck jaws.

Third, to provide an improved connection and means whereby the locking latch is released simultaneously with the opening of the chuck jaws.

Further objects and objects pertaining to details will definitely appear from the description to follow.

A preferred embodiment of my invention is illustrated in the accompanying drawings, in which.

The parts will be identified by their numerals of reference which are the same in all the views.

Figure 1:
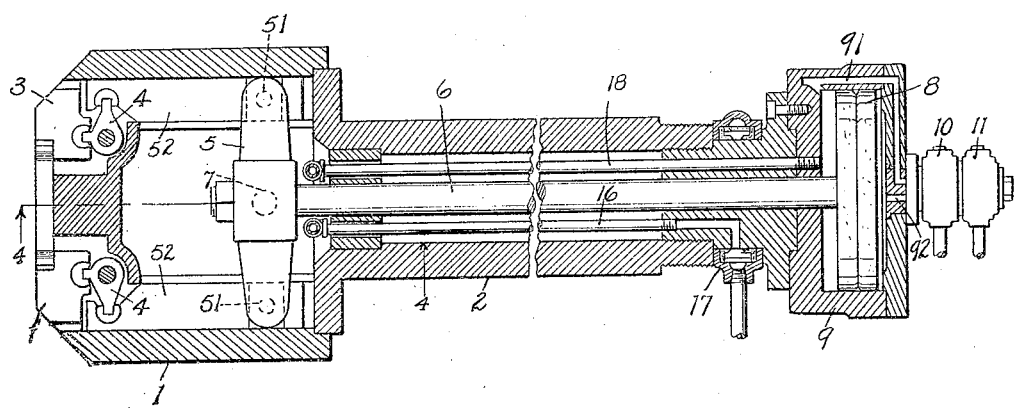
Fig. 1 is a detail sectional plan in broken sections of a chuck embodying the features of my invention, taken on a line corresponding to line 1—1 of Fig. 2, showing the pneumatic connections and the equalizing means for the chuck jaws.
Figure 3:
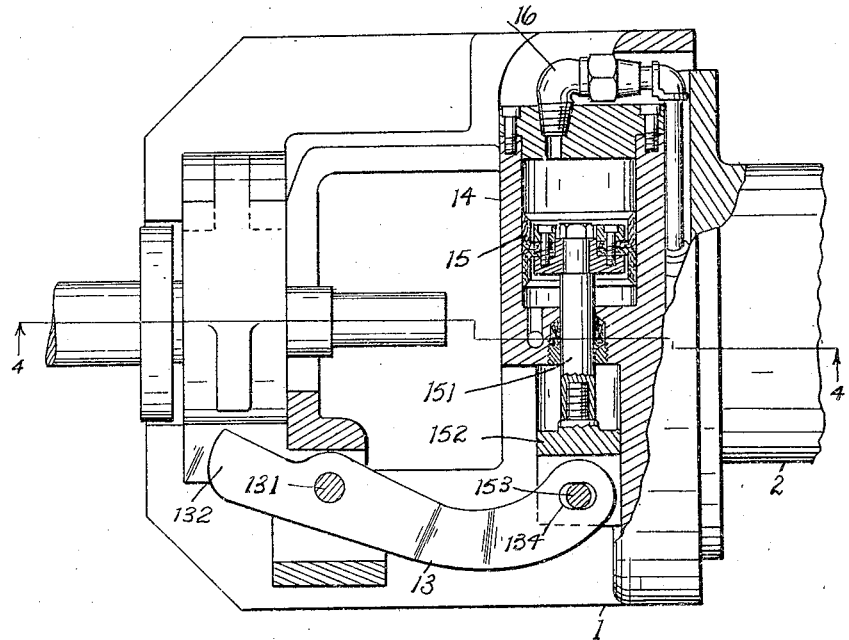
Fig. 3 is an enlarged detail plan view partially in section through the latch operating cylinder and adjacent parts, taken on irregular line 3—3 of Fig. 4.
Figure 4:
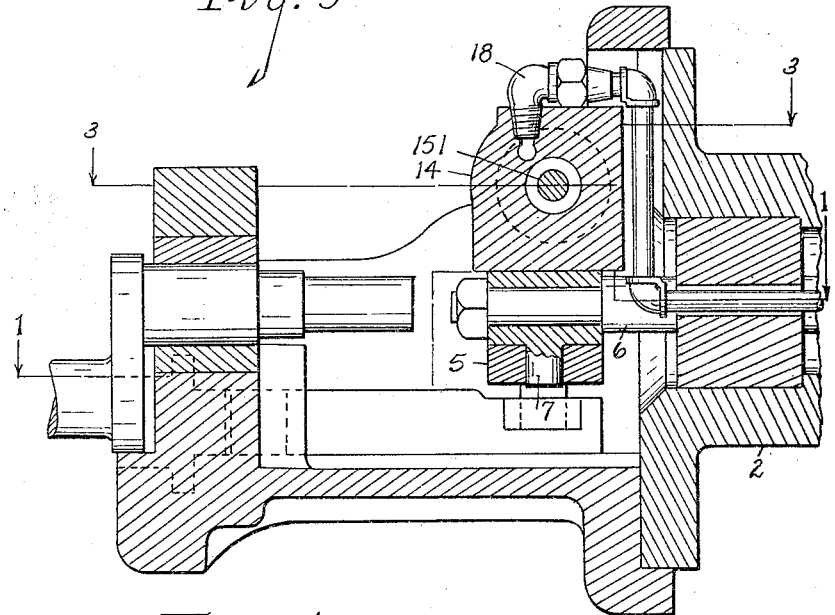
Fig. 4 is an enlarged detail sectional elevation on the plane of irregular line 4—4 of Figs. 2 and 3.

1 is the chuck body. This is supported on a suitable adapter 2 which is journaled to revolve in the lathe head. 3 3 are a pair of jaws reciprocating in suitable ways in the chuck body and are actuated by bell cranks 4 4 which means and actuation are exactly like those appearing in Patent #1,711,787, May 7, 1929, to Hopkins. These bell cranks are actuated from an equalizer bar 5 which is pivotally connected to a draw bar or piston rod 6, by the transverse pivot 7, seen in dotted lines in Fig. 1. The opposite ends of the equalizer bar 5 are pivoted at 51 51 to reciprocating connecting bars or links 52 52 carried in suitable ways in the said chuck body 1 and engaging the bell cranks to actuate the jaws.

Piston rod or draw bar 6 is actuated by double acting air piston 8 in cylinder 9. Air is supplied to the cylinder 9 by the distributors 10 and 11. Distributor 10 is connected to deliver air through passage 91 to the left hand end of the cylinder and distributor 11 is connected to deliver to the right hand end of cylinder 9 through the passage 92, the supply of air being controlled by any suitable valve means, not shown.

Figure 2:
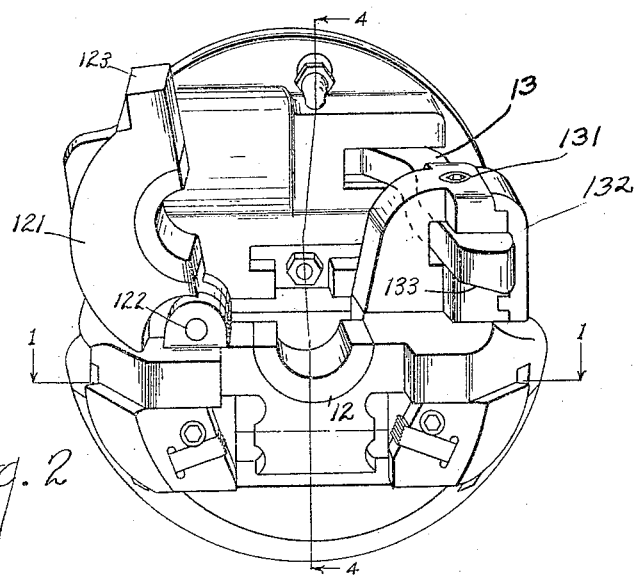
Fig. 2 is an enlarged detail front perspective view of the chuck part.

The chuck is provided with a divided central bearing member 12, the upper portion being divided and formed in a pivoted cap 121 which is pivoted at 122. The cap 121 is provided with a projecting square-ended lug 123. The cap is shown in open position in Fig. 2, but when it is closed it is acted upon and locked in position by the action of the lever 13 which is fulcrumed on transverse pin 131 in the chuck body, the short end of the lever 132 having a wedge shaped or cam face 133 to engage the lug and lock the cap, seen particularly in Fig. 2.

Lever 13 is actuated from the pneumatic cylinder 14 which is provided with an appropriate piston 15 with piston rod 151 connected to crosshead 152 which is provided with pin 153 which engages slot 134 in the lever 13.

It will thus be seen that on reciprocation of the piston 15, the lever 13 will be actuated. Air is admitted at the bottom of the cylinder 14 to operate the lever 13 to lock the cap. Air is delivered to the bottom of the cylinder through the connection 16 which extends to a distributor 17 within which the adapter and chuck body revolves. Air is admitted through a two-way valve not shown. Air is admitted to the rear of cylinder 14 to release the latch and cap through connection 18 which is disposed within the hollow adapter and is extended to the forward end of cylinder 9 and is supplied with air from that source.

Having described the parts, I will now indicate their operation. The journal of the crankshaft is placed within the central bearing member 12 and cap 121 is dropped down upon it. Air is then admitted through the distributor 17 through the connection 16 into the cylinder 14 and drives the piston 15 outwardly, actuating the lever 13 and forcing the cam surface 133 of its short end up onto the lug 123 of the cap, thus securely and quickly locking the same in place. Air is then admitted through the distributor 11 into the right hand of the cylinder 9 actuating the piston 8 and through its piston rod 6 and connections closing the jaws 3 onto an arm or projecting part of the rockshaft to lock the same securely in place against rotation and displacement.

When the lathe operation has been completed, air is admitted through distributor 10. This goes to the left hand end of cylinder 9 and drives the piston 8 toward the right releasing the jaws 13. The air, being thus under pressure in the left end of said cylinder, it is delivered through connection 18 to the head end of the cylinder 14, driving the piston 15 inwardly, actuating the lever 13 and releasing the cap 121 so that the work can be at once removed and another crankshaft put in place.

I have described my improvement in the preferred form which I believe to be best and I wish to claim the same specifically. I will also add that the structure can be greatly modified and I therefore desire to claim the invention broadly as pointed out in the appended claims.

Having thus described my invention what I claim as new and desire to secure by Letters Patent is:

1. In a pneumatic chuck structure, the combination of a chuck body, a pair of jaws, equalizer connections thereto, a pneumatic cylinder with air distributor with connection to the said equalizer having means to deliver air thereto for the operation of the same, a central bearing member for the said chuck divided with the upper portion forming a pivoted cap with projecting lug, a latch lever with cam surface fulcrumed and arranged to act upon the said lug to lock the cap in position, a pneumatic cylinder connected to the said latch lever, independent air connection for operating the said latch cylinder to close the latch, and a connection from the opposite end of said latch cylinder to the releasing end of the actuating cylinder, whereby the latch will be automatically released when the jaws are released.

2. In a chuck structure, a pneumatic chuck, a double acting pneumatic cylinder with piston connected to actuate the said chuck, a central bearing member for the said chuck divided and one portion forming a pivoted cap, a lever with cam shaped end disposed to lock said cap in position, an auxiliary pneumatic cylinder with double acting piston connected to said lever for actuating the same, an independent air connection to said cylinder to actuate the lever to lock the cap, and an air connection from the opposite end of said auxiliary cylinder to the releasing end of the chuck cylinder, whereby releasing the chuck will actuate the lever to unlock the cap.

3. In a chuck structure, a pneumatic chuck, a double acting pneumatic cylinder with piston connected to actuate the said chuck, a central bearing member for the said chuck divided and one portion forming a pivoted cap, and a lever with cam shaped end disposed to lock said cap in position, and mechanism associating said lever with the chuck control.

4. In a chuck structure, a central bearing member divided and one part forming a pivoted cap, said cap having a projecting lug surface, a lever with cam shaped end disposed to coact with said lug to lock the said cap in place, and an auxiliary engine cylinder with piston connected to said lever for actuating the same.

In witness whereof I have hereunto set my hand.

HAROLD A. TOMKINS.